United States Patent
Jeong et al.

(10) Patent No.: US 11,638,472 B2
(45) Date of Patent: May 2, 2023

(54) STICKER WITH USER-EDITED IMAGE PRINTED THEREON AND METHOD FOR MANUFACTURING SAME

(71) Applicant: DS GLOBAL, Seoul (KR)

(72) Inventors: Ik Sung Jeong, Goyang-si (KR); Seong Bok Yoon, Seoul (KR)

(73) Assignee: DS GLOBAL, Seoul (KR)

( * ) Notice: Subject to any disclaimer, the term of this patent is extended or adjusted under 35 U.S.C. 154(b) by 423 days.

(21) Appl. No.: 16/761,900

(22) PCT Filed: Nov. 6, 2018

(86) PCT No.: PCT/KR2018/013378
§ 371 (c)(1),
(2) Date: May 6, 2020

(87) PCT Pub. No.: WO2019/088798
PCT Pub. Date: May 9, 2019

(65) Prior Publication Data
US 2021/0007459 A1 Jan. 14, 2021

(30) Foreign Application Priority Data

Nov. 6, 2017 (KR) .......................... 10-2017-0146672
Oct. 24, 2018 (KR) .......................... 10-2018-0127450

(51) Int. Cl.
*G06T 11/60* (2006.01)
*G06T 19/00* (2011.01)
(Continued)

(52) U.S. Cl.
CPC ........... *A45D 29/001* (2013.01); *A45D 29/18* (2013.01); *A45D 31/00* (2013.01); *G06T 7/60* (2013.01);
(Continued)

(58) Field of Classification Search
None
See application file for complete search history.

(56) References Cited

U.S. PATENT DOCUMENTS

2008/0122175 A1* 5/2008 Deng .................. A63F 3/00697
273/260
2011/0187743 A1* 8/2011 Hwang ................. G06T 19/006
345/619
(Continued)

FOREIGN PATENT DOCUMENTS

KR 20030083763 10/2003
KR 20050021092 3/2005
(Continued)

OTHER PUBLICATIONS

Senecalabel, "Printing Process", Feb. 8, 2017, URL: https://web.archive.org/web/20170208220355/http://www.senecalabel.com/printing-process/ (Year: 2017).*
(Continued)

*Primary Examiner* — David H Chu
(74) *Attorney, Agent, or Firm* — Cantor Colburn LLP

(57) ABSTRACT

A method for providing an augmented reality service using an AR sticker comprises: a step where a mobile terminal requests, from a server, an AR sticker template enabling a user to edit an AR sticker, and the server transmits the AR sticker template; a step where the mobile terminal directly edits the AR sticker image using the AR sticker template and creates AR content corresponding to the AR sticker image; a step where the server receives the AR sticker image and the AR content from the mobile terminal and stores same in an AR database, and creates an AR sticker including the AR sticker image and the AR content; a step where the mobile terminal receives the AR sticker, transmits the AR sticker to a printer, and requests printing of the AR sticker; and a step
(Continued)

where the printer prints the AR sticker and conveys the printed AR sticker.

13 Claims, 18 Drawing Sheets

(51) Int. Cl.
    *G06T 11/00*     (2006.01)
    *A45D 29/00*     (2006.01)
    *A45D 29/18*     (2006.01)
    *A45D 31/00*     (2006.01)
    *G06T 13/00*     (2011.01)
    *G06T 7/60*     (2017.01)
    *G06T 19/20*     (2011.01)

(52) U.S. Cl.
    CPC .............. *G06T 11/00* (2013.01); *G06T 11/60* (2013.01); *G06T 13/00* (2013.01); *G06T 19/006* (2013.01); *G06T 19/20* (2013.01); *G06T 2200/24* (2013.01); *G06T 2207/30* (2013.01); *G06T 2219/004* (2013.01); *G06T 2219/2012* (2013.01)

(56) References Cited

U.S. PATENT DOCUMENTS

| | | | | |
|---|---|---|---|---|
| 2011/0221771 A1* | 9/2011 | Cramer | ............... | G06Q 30/02 |
| | | | | 345/633 |
| 2013/0235078 A1* | 9/2013 | Takahashi | ............... | G06T 11/00 |
| | | | | 345/633 |
| 2016/0176183 A1* | 6/2016 | Manwiller | ............ | C04B 41/009 |
| | | | | 347/217 |
| 2019/0095712 A1* | 3/2019 | Jung | ...................... | G06V 10/22 |

FOREIGN PATENT DOCUMENTS

| | | |
|---|---|---|
| KR | 20100011174 | 2/2010 |
| KR | 20120087207 | 8/2012 |
| KR | 101539087 | 7/2015 |
| KR | 20160102372 | 8/2016 |
| KR | 20160110580 | 9/2016 |
| KR | 20170011468 | 2/2017 |

OTHER PUBLICATIONS

International Search Report—PCT/KR2018/013378 dated Feb. 28, 2019.

* cited by examiner (a)

(b)

(a)

(b)

STICKER WITH USER-EDITED IMAGE PRINTED THEREON AND METHOD FOR MANUFACTURING SAME

TECHNICAL FIELD

The present invention relates to a sticker on which a user-edited image has been printed and a method of fabricating the same and, more particularly, to a sticker on which an image directly edited by a user has been printed using a sticker template and a method of fabricating the same

BACKGROUND ART

In general, a conventional nail art is directly drawn on a surface of a nail and requires lots of efforts and an expert's technique. In order to improve this, a method of attaching, on a nail, a sticker on which a pattern has already been printed is used, but does not satisfy user needs that require a user's nail sticker or face painting sticker.

Korean Patent Application Laid-Open No. 10-2016-0110580 (hereinafter referred to as "Patent Document 1") discloses a transparent base nail sticker, but Patent Document 1 does not disclose a technology for printing an image directly edited by a user.

Furthermore, an augmented reality (AR) is a technology for displaying a virtual object by overlapping it with the real world seen by a user's eye, and has a characteristic in that it can reinforce and provide pieces of additional information that are difficult to obtain through only the real world by synthesizing a virtual thing on the real world unlike the existing virtual reality focused on only a virtual space and a thing.

First, Korean Patent Application Laid-Open No. 10-2017-0011468 (hereinafter referred to as "Patent Document 1") is an invention related to an AR sticker, and relates to a sticker in which augmented reality making a three-dimensional virtual object look overlapped with a real object.

Furthermore, Korean Patent No. 10-1539087 (hereinafter referred to as "Patent Document 2") is a technology for recognizing a motion of a subject person in a captured image and performing an interaction with augmented reality content.

However, Patent Document 1 discloses only the sticker technology for providing an augmented reality service. Patent Document 2 discloses only a technology for providing content based on a change in the location of a subject and a terminal.

DISCLOSURE

Technical Problem

An object of the present invention can provide a method of fabricating a nail sticker on which an image directly edited by a user has been printed using a sticker template and a sticker fabricated using such a method.

Technical Solution

A method of fabricating a sticker on which a user-edited image has been printed according to the present invention for achieving the object includes the steps of requesting, by a mobile terminal, a sticker template provided to be capable of being directly edited by a user from a server and receiving the sticker template from the server, directly editing, by the mobile terminal, a sticker image using the sticker template, requesting, by the mobile terminal, a printing device to print the edited sticker image, and printing, by the printing device, the sticker image on a member corresponding to the selected sticker template and transmitting the printed sticker to the mobile terminal.

An operating method of a system providing an augmented reality service using an AR sticker fabricated by a user according to the present invention includes the steps of requesting, by a mobile terminal, an AR sticker template provided to be capable of being directly edited by a user from a server and transmitting, by the server, the AR sticker template, directly editing, by the mobile terminal, an AR sticker image using the AR sticker template and generating AR content corresponding to the AR sticker image, receiving, by the server, the AR sticker image and the AR content from the mobile terminal, storing the received AR sticker image and AR content in an AR database, and generating an AR sticker comprising the AR sticker image and the AR content, receiving, by the mobile terminal, the AR sticker generated by the server and requesting a printing device to print the AR sticker by transmitting the AR sticker, and printing, by the printing device, the AR sticker on a transparent plastic member and transmitting the printed AR sticker.

Advantageous Effects

Through such solving means, the present invention can provide a nail sticker or a sticker for face painting on which a sticker image directly fabricated by a user has been printed.

Furthermore, the present invention can provide an augmented reality service using an AR sticker image and directly fabricated AR content.

Furthermore, an AR sticker can be used as marketing means because it can display AR content for advertising purposes, directly fabricated by a user through an inserted marker, as an augmented reality service.

Furthermore, an AR sticker can provide its own content through AR using the AR sticker in a nail art, body painting, etc.

MODE FOR INVENTION

Figure 1:
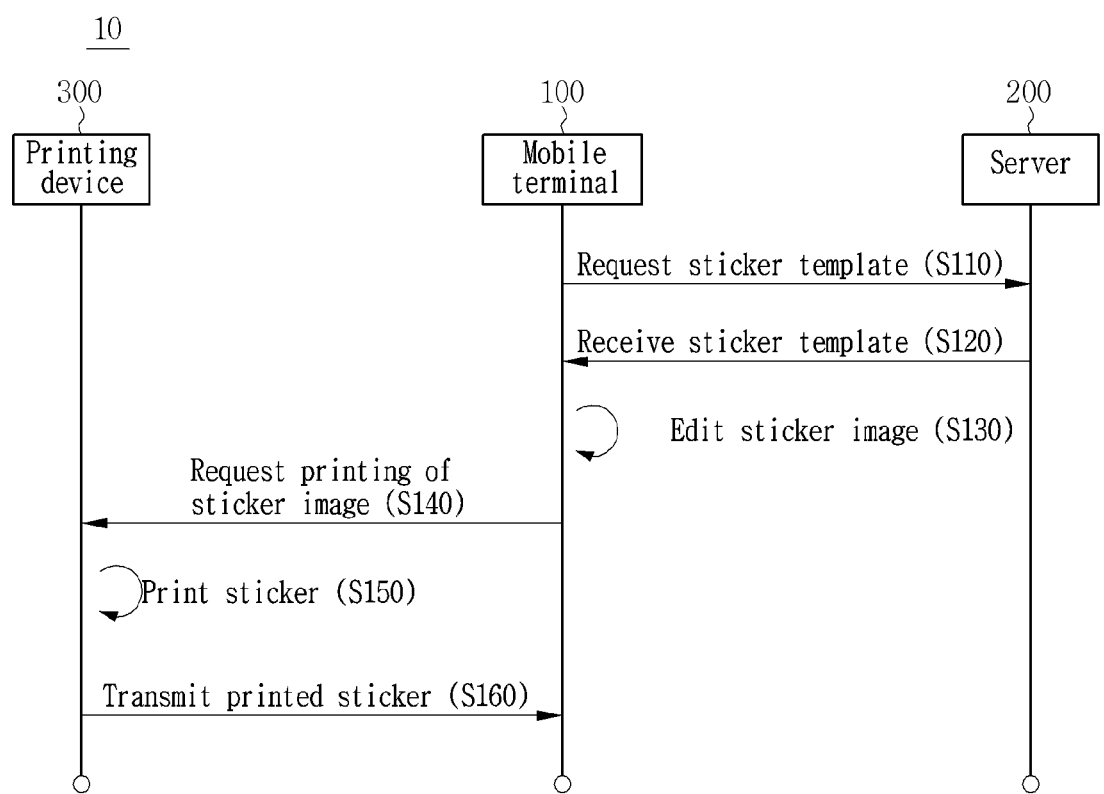
FIG. 1 is a flowchart describing a method of fabricating a sticker on which a user-edited image has been printed according to an embodiment of the present invention.

A specific structural or functional description of embodiments according to the concept of the present invention disclosed in this specification has been merely illustrated for the purpose of describing the embodiments according to the concept of the present invention. The embodiments according to the concept of the present invention may be implemented in various forms and are not limited to embodiments described in this specification.

The embodiments according to the concept of the present invention may be changed in various ways and may have various forms, and thus the embodiments are illustrated in the drawings and described in detail in this specification. However, this is not intended to limit the embodiments according to the concept of the present invention to specific disclosed forms. The embodiments include all changes, equivalents or substitutes included in the spirit and technical scope of the present invention.

The terms used in this specification are used to only describe specific embodiments and are not intended to restrict the present invention. An expression of the singular number includes an expression of the plural number unless clearly defined otherwise in the context. In this specification, terms, such as "include" or "have", are intended to designate that characteristics, numbers, steps, operations, elements, or parts which are described in the specification, or a combination of them exist, and should be understood that it does not exclude the existence or possible addition of one or more other characteristics, numbers, steps, operations, elements, parts, or combinations of them in advance.

Hereinafter, the embodiments of this specification are described in detail with reference to the drawings attached to this specification.

Figure 2:
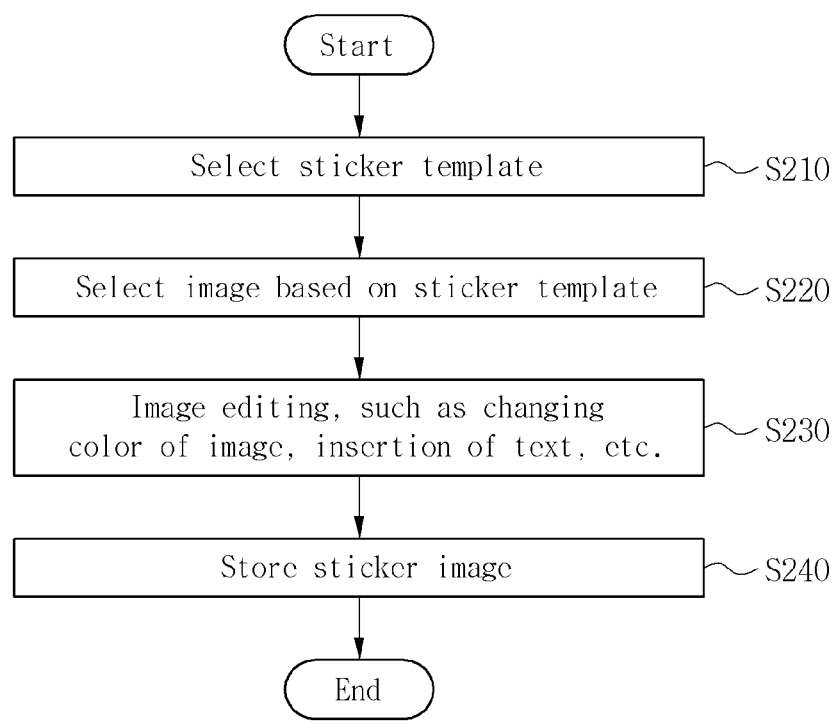
FIG. 2 is a flowchart describing an image editing method according to an embodiment of the present invention.

FIGS. 1 and 2 are flowcharts describing methods of fabricating a sticker on which a user-edited image has been printed according to an embodiment of the present invention.

Referring to FIG. 1, a mobile terminal 100 requests, from a server 200, a sticker template provided to be capable of being directly edited by a user (S110), and receives the sticker template from the server (S120). The sticker template may be requested from the server by the user in a form in which the sticker image can be directly edited by the user by executing an application. The sticker template provides a different template for each category. The category may be at least one of a nail sticker and a face painting sticker, but is not limited thereto.

The mobile terminal directly edits a sticker image using the sticker template received from the server (S130). The mobile terminal transmits, to a printing device, the sticker image stored after the image editing is completed, and requests printing from the printing device (S140).

The printing device 300 prints the sticker image on a member corresponding to a selected sticker template, and transmits the printed sticker to the mobile terminal (S160). In this case, if the selected sticker template is a nail sticker, the selected sticker template may be a member shown in FIG. 6. If the selected sticker template is a face painting sticker, the selected sticker template may be a member shown in FIG. 7. However, the present invention is not limited thereto.

FIG. 2 is a flowchart describing the step of editing an image. The mobile terminal 100 selects one of multiple sticker templates (S210), and selects an image based on the selected sticker template (S220). Thereafter, the mobile terminal 100 performs editing on the sticker image, but performs editing, such as changing a color of the selected image or the insertion of text (S230). When the editing is completed, the mobile terminal 100 stores a sticker image directly edited by a user (S240).

Figure 3:
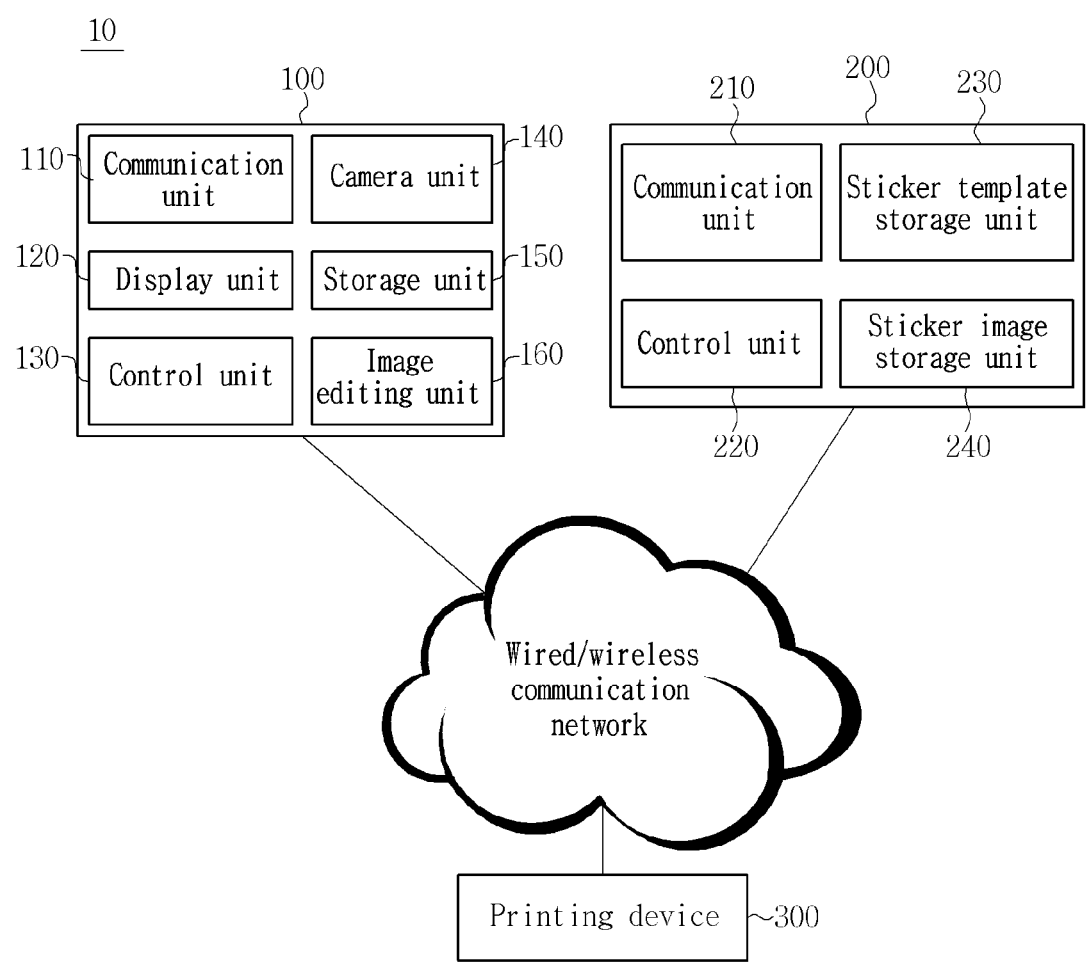
FIG. 3 shows the construction of a sticker fabrication system according to an embodiment of the present invention.

FIG. 3 shows the construction of a sticker fabrication system according to an embodiment of the present invention.

Referring to FIG. 3, the sticker fabrication system 10 is configured with the mobile terminal 100, the server 200, and the printing device 300. The mobile terminal 100 is configured with a communication unit 110, a display unit 120, a control unit 130, a camera unit 140, a storage unit 150, and an image editing unit 160.

The communication unit 110 may receive a sticker template from the server 200, and may request the printing of an edited sticker image from the printing device 300. The display unit 120 may provide the sticker template by displaying it so that a user can edit the sticker image.

The control unit 130 controls the processing of a process related to the execution of application software, and controls an operation of each of the elements of the mobile terminal 100. The control unit 130 may control the processing of a process related to execution using a web browser through the World Wide Web in addition to application software.

The storage unit 150 may store an edited sticker image and store a sticker template received from the server 200.

The image editing unit 160 may perform at least one of operations, such as a change of a color, the insertion of text, a change of the size, and direct drawing for a selected sticker image.

The server 200 is configured with a communication unit 210, a control unit 220, a sticker image storage unit 230, and a sticker image storage unit 240. The communication unit 210 may transmit a sticker template to the mobile terminal 100. The control unit 230 controls the processing of a process related to the execution of application software, and controls an operation of each of the elements of the server 200. The sticker template storage unit 230 may store a sticker template and provide the sticker template to the mobile terminal 100. The sticker image storage unit 240 may store sticker images corresponding to a sticker template and provide a sample image to the mobile terminal 100.

The printing device 300 prints a sticker image, received from the mobile terminal 100, on a member corresponding to a sticker template, and transmits the printed sticker to the mobile terminal 100.

Figure 4:
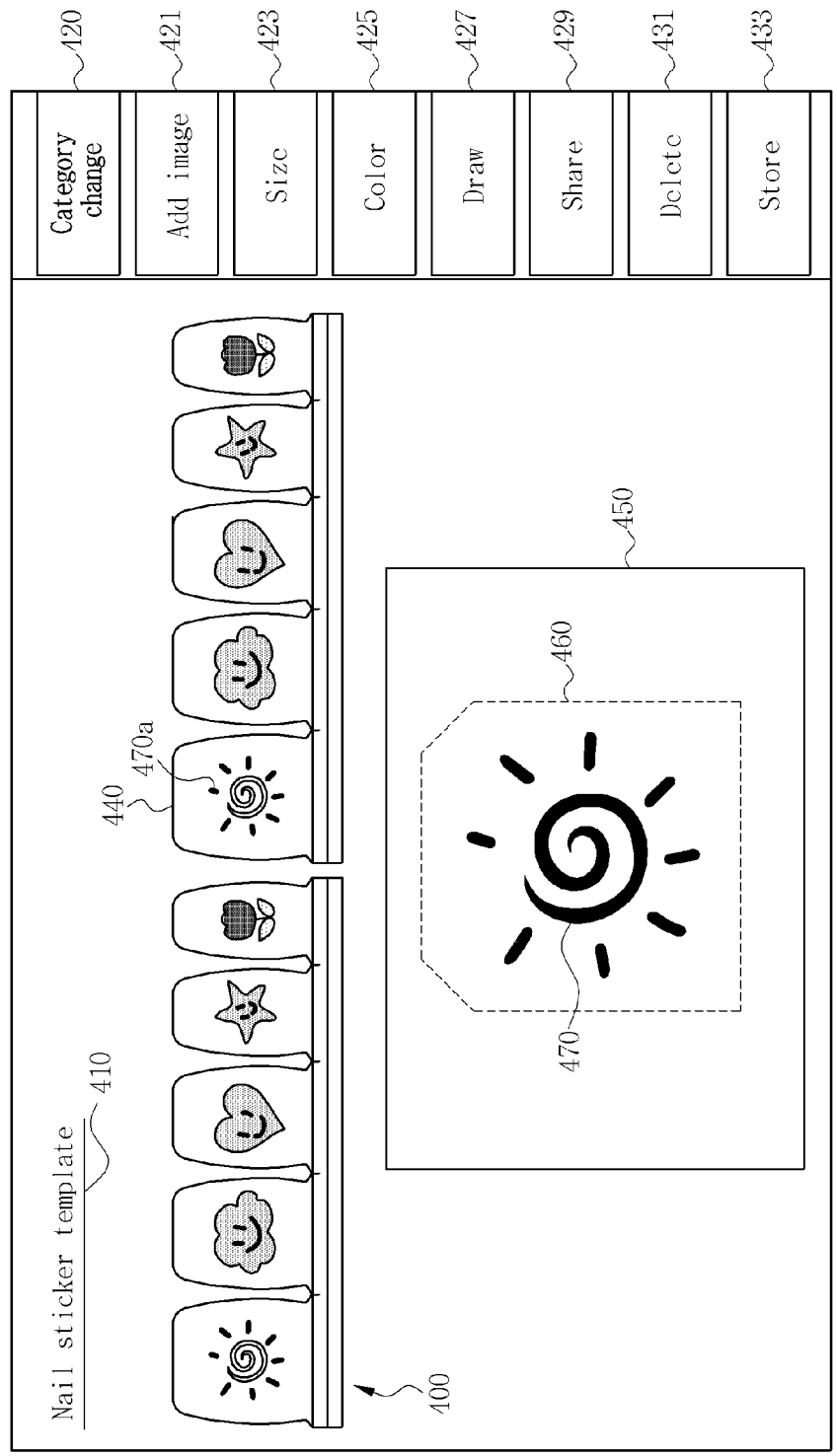
FIGS. 4 and 5 are diagrams describing a sticker template operating method according to an embodiment of the present invention.
Figure 5:
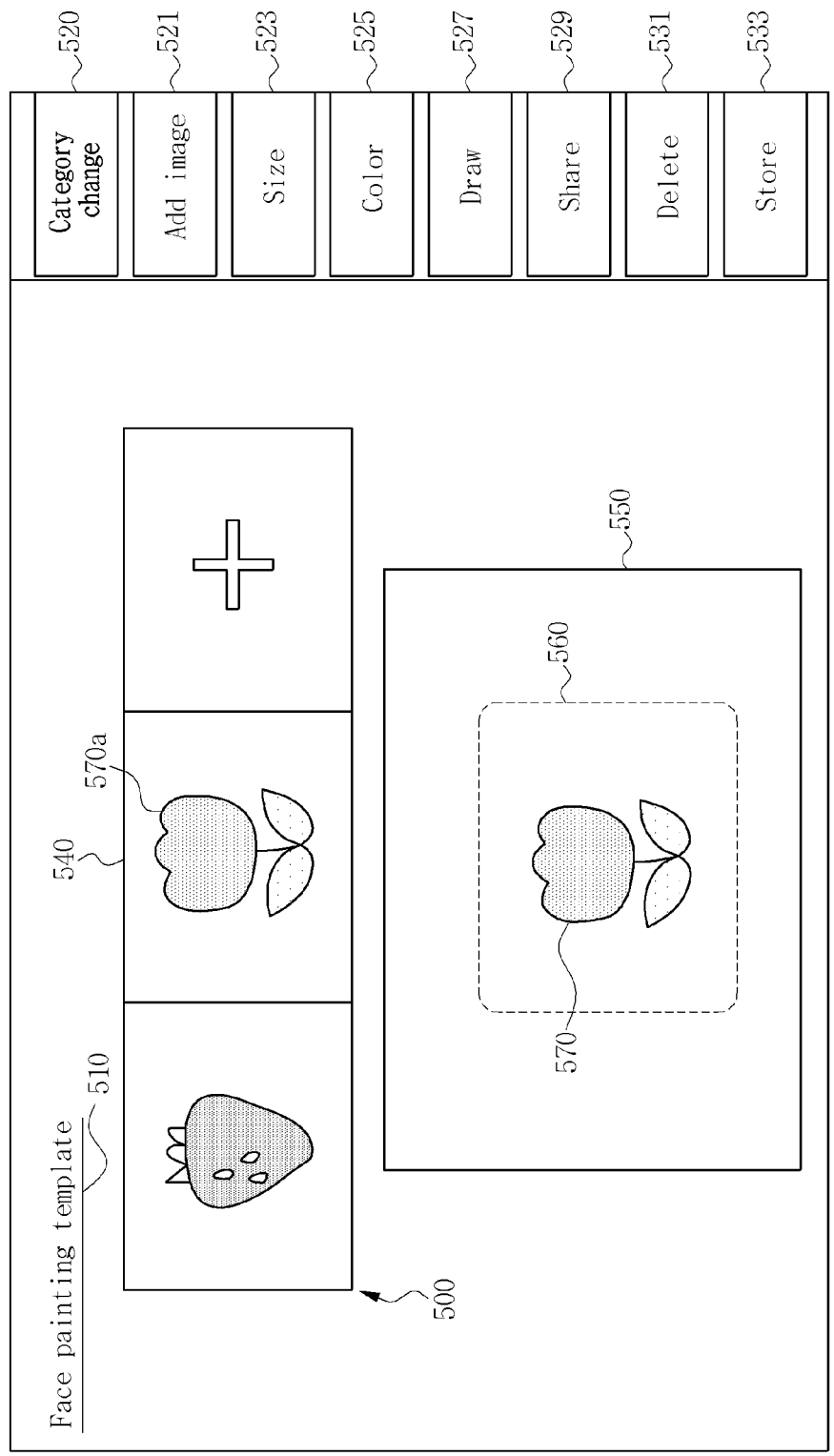

FIGS. 4 and 5 are diagrams describing a sticker template operating method according to an embodiment of the present invention.

Referring to FIGS. 4 and 5, when a sticker template is selected by a user, the image editing unit 160 may display the corresponding sticker template on the display unit. FIG. 4 is an operating screen when a nail sticker template is selected. When a nail sticker template is selected, the layout of nail stickers 400 is displayed. A user may click a displayed nail icon 440 and add an image. A user may select an image addition button 421 and add an already stored image. Furthermore, a selected image 470 may be displayed in a user editing window 450. The selected image may be positioned in a region 460 in which the virtual size of a nail is overlapped and displayed in accordance with the size of each of nail icons 440. In this case, the size of the selected image 470 may be adjusted and incorporated into the nail icon 440, 470a within the virtual size region 460. A user may select a size button 423 and adjust the size of the selected image 470, and may select a color button 425 and change a color of the selected image 470. When a drawing button 427 is selected, a drawing editor that enables a user to directly draw an image is loaded, so the user may directly generate an image. A user may select a sharing button 429 and share an edited image through social network service. A user may select a deletion button 431 and delete an edited image, and may select a storage button 433 and store an edited image. An edited image may be stored, and an edited image may be transmitted to the printing device in order to request the printing of the edited image from the printing device.

FIG. 5 is an operating screen when a face painting template is selected. When a user selects a face painting template, the layout of face painting stickers 500 is displayed. The user may click each of the displayed face painting icons 540 and add an image. The user may select an image addition button 521 and add an already stored image. Furthermore, a selected image 570a may be displayed in a user editing window 550, and may be positioned in a region 560 in which the virtual size of a nail is overlapped and displayed in accordance with the size of each of the face painting icons 540. In this case, the size of the selected image 570 may be adjusted and incorporated into the face painting icon 540, 570a within the virtual size region 560. A user may select a size button 523 and adjust the size of the selected image 570, and may select a color button 525 and adjust a color of the selected image 570. When a drawing button 527 is selected, a drawing editor that enables a user to directly draw an image is loaded, so the user may directly generate an image. A user may select a sharing button 529 and share an edited image through social network service. A user may select a deletion button 531 and delete an edited image, and may select a storage button 533 and store an edited image. An edited image may be stored, and an edited image may be transmitted to the printing device in order to request the printing of the edited image from the printing device.

Figure 6:
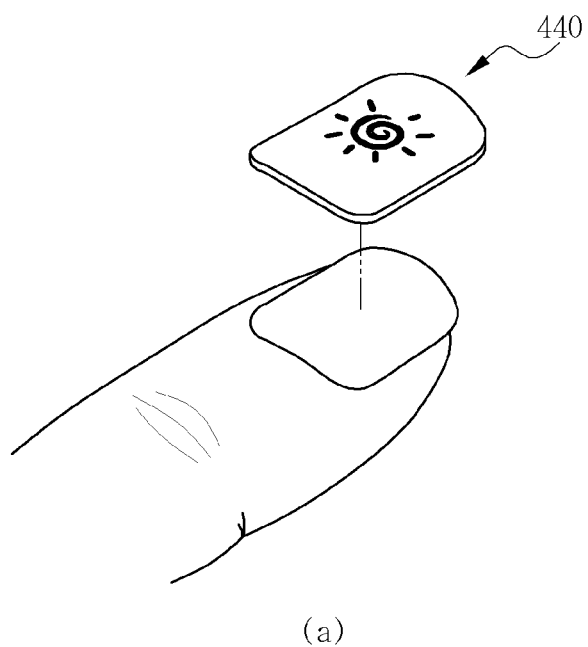
FIG. 6 is a use state diagram and cross-sectional view of a sticker fabricated according to an embodiment of the present invention.
Figure 6:
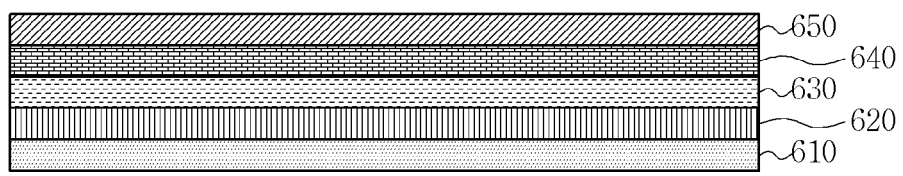

FIG. 6 is a use state diagram and cross-sectional view of a sticker fabricated according to an embodiment of the present invention. Referring to FIG. 6, according to the present invention, a printed nail sticker 440 may be separated and attached to a nail of a user. In this case, the nail sticker 440 includes a release layer 610, an adhesion layer 620, a body layer 630, a design layer 640, and a protection film 650. The release layer 610 is removed prior to adhesion to a nail, and protects the adhesion layer 620. The adhesion layer 620 is an adhesive for fixing a nail and a nail sticker. The body layer 630 may have a film shape mace of a flexible synthetic resin or may be a three-dimensional material having a hard nail shape. The body layer may be fabricated using a PE material, for example. An edited sticker image may be printed on the design layer 640. To this end, printing using an inkjet method or a laser toner method or screen printing may be applied to the body layer. The protection film 650 is located on the design layer 640 and transparent, and functions to protect the design layer 640 against an external scratch. For example, the protection film may be an enamel layer, an epoxy layer or a silicon layer. The protection film 650 may be optionally omitted.

Figure 7:
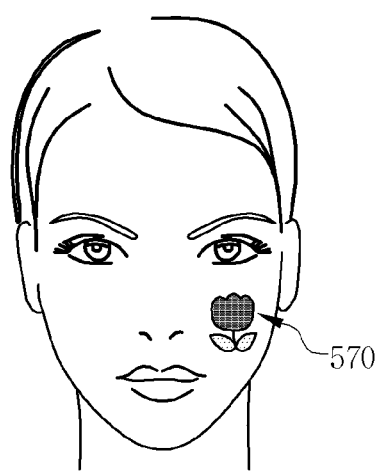
FIG. 7 is a use state diagram and cross-sectional view of a sticker fabricated according to another embodiment of the present invention.
Figure 7:
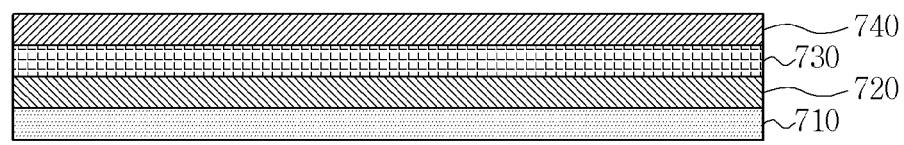

FIG. 7 is a use state diagram and cross-sectional view of a sticker fabricated according to another embodiment of the present invention.

Referring to FIG. 7, a face painting sticker 570 includes a protection film 710, a design layer 720, a transcription-induced layer 730, and a release layer 740.

The protection film 710 is removed before the design layer 710 is transcribed into the body, and is provided on the other side of the design layer 710. In this case, the protection film 710 functions to protect the design layer 720. Furthermore, the protection film 710 is not limited to a special component, but may be formed using a blend or copolymer of at least one type among PET, OPP, PP, PS, PE, PVC, PVDC, EVA, PU, TPU, polyamide, polyester, EVA, and acryl.

An edited sticker image may be printed on the design layer 720, and the printed design may be transcribed into the body. The release layer 740 may be removed after the design layer 720 is transcribed into the body. A design is displayed on the design layer 720 and transcribed into the body. The design layer may include ink and a medium.

The transcription-induced layer 730 may be coated between the design layer 720 and the release layer 740. In this case, the transcription-induced layer 730 may be formed using UV paints, solvent type paints or aqueous paints including synthetic resin particles. In this case, the synthetic resin particles is a kind of bead, and may be formed using silica, glass, acryl or urethane or a copolymer or blend of two or more of them. As described above, the transcription-induced layer 730 includes the synthetic resin particles. Accordingly, the design layer can be effectively transcribed into the body because the design layer 720 can be easily printed on the release layer 740 and can be easily separated from the release layer 740.

The release layer 740 is removed after the design layer 720 is transcribed into the body, and is provided on one side of the design layer 110. In this case, the release layer 740 may be formed using a polyethylene terephthalate (PET) film or polyethylene (PE) film on which a silicon release agent or fluorine release agent has been coated. An elastic layer having a synthetic or natural polymer structure, such as paper, polyethylene, ethylene vinyl acetate, polypropylene, latex, urethane, or foam, may be formed in the release layer 740.

Figure 8:
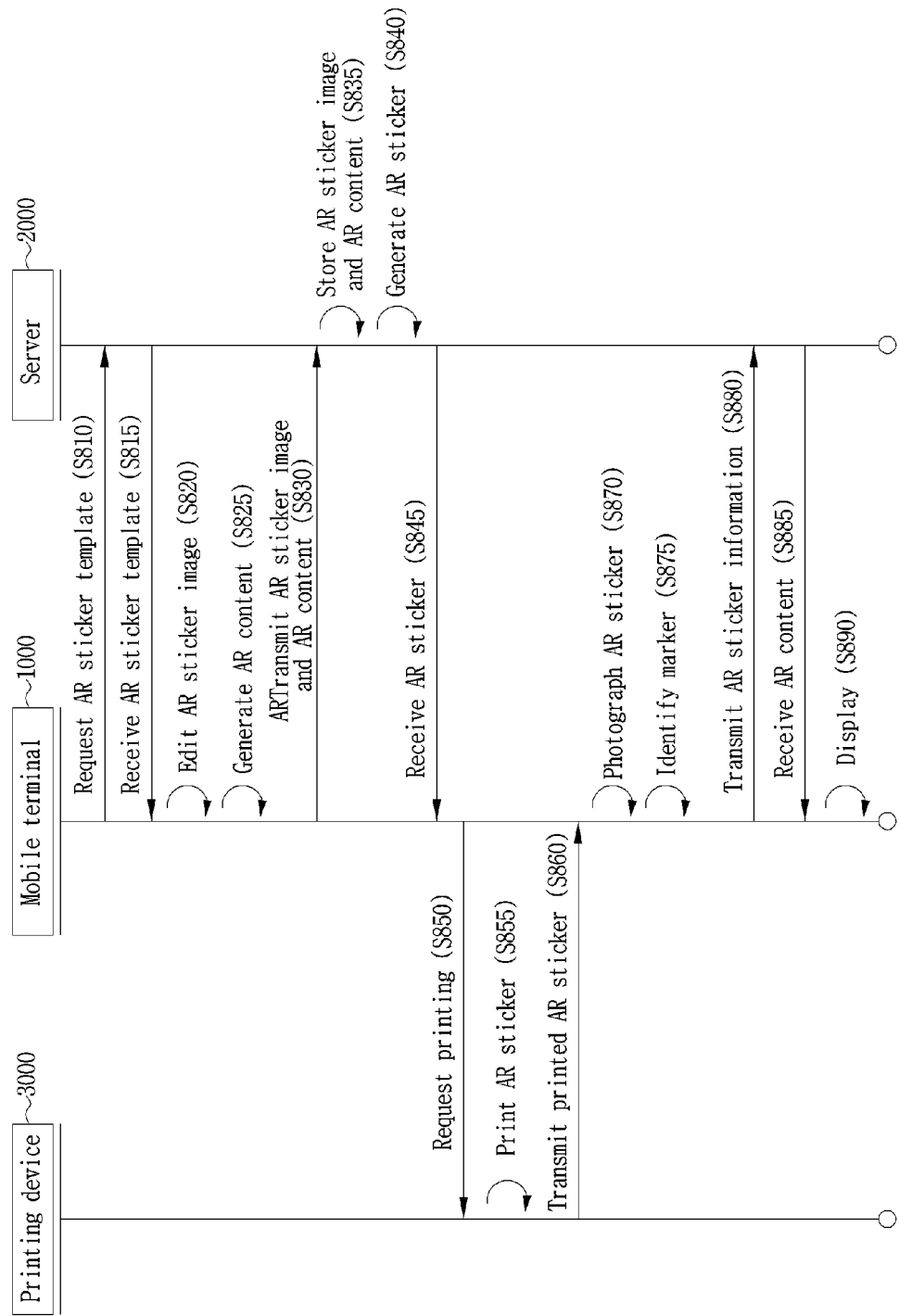
FIG. 8 is a flowchart describing a method of providing an augmented reality service using an AR sticker edited by a user according to another embodiment of the present invention.

FIG. 8 is a flowchart describing a method of providing an augmented reality service using an AR sticker edited by a user according to another embodiment of the present invention.

Referring to FIG. 8, in an operating method of a system providing an augmented reality service using an AR sticker fabricated by a user, after a mobile terminal 1000 examines a dedicated application already downloaded from a server, the mobile terminal 1000 requests, from the server 2000, an AR sticker template provided to be capable of being directly edited by a user (S810), and receives the AR sticker template from the server 2000 (S815). The AR sticker template provides various images and text so that the AR sticker template can be directly edited by a user. The image may be at least one of a character, an animal, a flower, a figure or a pattern. In some embodiments, the image may be a pattern used in the nail art, and may be fabricated by a user through direct drawing.

The mobile terminal 1000 directly edits an AR sticker image using the AR sticker template (S820), and generates AR content corresponding to the AR sticker image (S825). In this case, a user may generate his or her own AR content through the dedicated application of the mobile terminal 1000. That is, the AR content may include at least one of a dynamic image, a sound, text, a 2D image, a sticker, and a video. For example, a video or an image may be edited through the application, or an advertising video audio file previously stored in the mobile terminal may be selected. The mobile terminal 1000 transmits the generated AR sticker image and AR content (S830).

Thereafter, the server 2000 receives the AR sticker image and AR content from the mobile terminal, stores them in an AR database (S835), and generates an AR sticker including the AR sticker image and AR content (S840). In this case, a marker is inserted into the AR sticker. The marker is a key connected to the AR content, and various media may be used as the marker. For example, an AR sticker image may be used, and a separate marker may be inserted. Augmented reality (AR) content has been stored in the AR database of the server 2000 as three-dimensional stereoscopic image information.

The mobile terminal 1000 receives the generated AR sticker from the server 2000 (S845), and requests a printing device 3000 to print the AR sticker from by transmitting the AR sticker (S850).

The printing device 3000 prints the AR sticker received from the mobile terminal 1000 (S855), and transmits the printed AR sticker to the mobile terminal (S860). In this case, the printing device 3000 may print the AR sticker on a transparent plastic member, but the printing member is not limited. The printing device 3000 is a portable printing device equipped with short-distance radio communication means, and may print an image received from the mobile terminal 1000 through the short-distance radio communication means and output a printed matter. The short-distance radio communication means may be any one of short-distance radio communication protocols, such as Bluetooth, a radio frequency identification (RFID), infrared data association (IrDA), a ultra wideband (UWB), Zigbee (IEEE 802.15.4), and Wi-Fi, but the present disclosure is not limited thereto, and may include an element configured to receive an image through wired communication.

When the mobile terminal 1000 photographs the AR sticker (S870) and identifies the marker in an obtained image (S875), the mobile terminal transmits, to the server, AR sticker information including an ID value of the corresponding marker (S880) and receives AR content corresponding to the AR sticker information (S885). In this case, the AR content may include at least one of a dynamic image, a sound, text, a 2D image, a sticker, or video corresponding to the marker.

The mobile terminal 1000 may display the received AR content based on the AR sticker information (S890).

That is, the present invention can provide an augmented reality service using an AR sticker image and AR content directly fabricated by a user. For example, the AR sticker can provide his or her own content through an AR using the AR sticker in a nail art or body painting.

Figure 9:
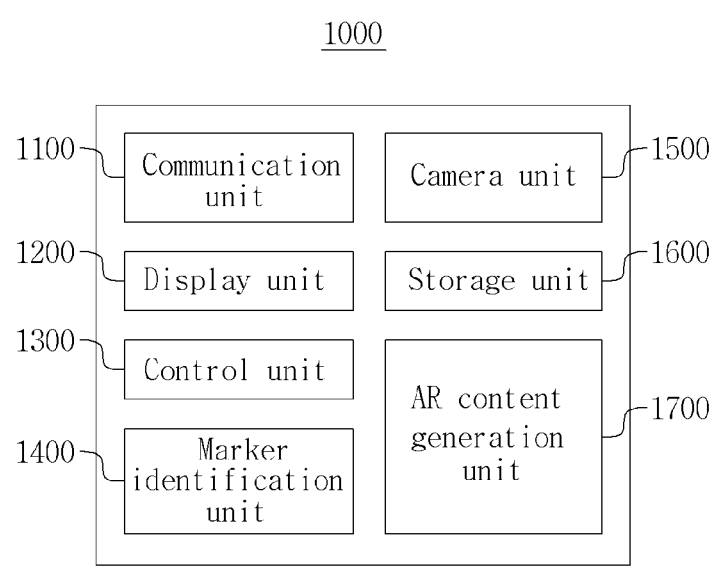
FIG. 9 is a block diagram showing the configuration of a user terminal of a system for providing an augmented reality service using an AR sticker edited by a user according to another embodiment of the present invention.

FIG. 9 is a block diagram showing the configuration of the user terminal of a system for providing an augmented reality service using an AR sticker edited by a user according to another embodiment of the present invention.

Referring to FIG. 9, the user terminal 1000 is configured with a communication unit 1100, a display unit 1200, a control unit 1300, a marker identification unit 1400, a camera unit 1500, a storage unit 1600, and an R content generation unit 1700.

The communication unit 1100 may transmit a generated AR sticker image and AR content to the server 2000, and may receive an AR sticker and AR content generated by the server 2000.

The display unit 1200 may overlap and display an image, captured by a camera, and AR content. The scale of the AR content may be changed in response to a user input.

The control unit 1300 controls the processing of a process related to the execution of application software, and controls an operation of each of the elements of the mobile terminal 1000. The control unit 1300 may control the processing of a process related to execution using a web browser through the World Wide Web in addition to application software.

The marker identification unit 1400 may identify a marker in an obtained image. The communication unit 1100 may request, from the server 2000, AR content corresponding to the marker. The marker is a key connected to the AR content, and various media may be used as the marker. When the marker is identified, the marker identification unit 1400 may extract an ID value of the corresponding marker and transmit, to the server 2000, information on the marker.

The camera unit 1500 obtains an image by photographing an AR sticker. Templates already downloaded from the server through a dedicated application may be stored in the storage unit 1600. The AR content generation unit 1700 may generate his or her own AR content in response to a user input. That is, the AR content may include at least one of a dynamic image, a sound, text, a 2D image, a sticker, and a video. For example, a video or image may be edited through the application or an advertising video or audio file previously stored in the mobile terminal may be selected.

An input unit (not shown) receives an input event executed by input means. The input unit may be a touch screen, and transmits a touch event to the control unit 1300. If the terminal 1000 is a desktop PC or a laptop PC, the input unit may receive an input event from a mouse.

In the specification of the present invention, the mobile terminal 1000 is a computing device, and is a mobile computing device which can drive a predetermined processor according to operating system software and various types of application software and which can be easily carried and used while moving like a smartphone or a tablet PC, but the present disclosure is not limited thereto. A desktop PC or a laptop PC may also be applied the mobile terminal.

Figure 10:
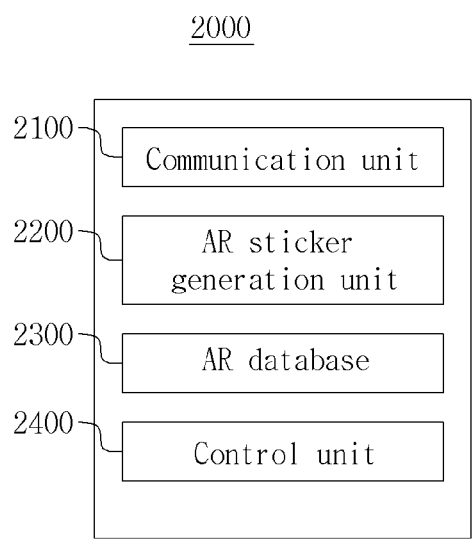
FIG. 10 is a block diagram showing the configuration of a server of the system for providing an augmented reality service using an AR sticker edited by a user according to another embodiment of the present invention.

FIG. 10 is a block diagram showing the configuration of the server of a system for providing an augmented reality service using an AR sticker edited by a user according to another embodiment of the present invention.

Referring to FIG. 10, the server 2000 is configured with a communication unit 2100, an AR sticker generation unit 2200, an AR database 2300, and a control unit 2400.

The communication unit 2100 may transmit a generated AR sticker to the mobile terminal 1000. When receiving AR sticker information from the mobile terminal 1000, the communication unit 2100 may provide AR content corresponding to the AR sticker.

When receiving an AR sticker image and AR content from the mobile terminal 1000, the AR sticker generation unit 2200 may generate an AR sticker by inserting a marker, corresponding to the AR content, into the AR sticker image provided by a user.

The AR database 2300 may store an AR sticker image and AR content received from the mobile terminal 1000, and may store an AR sticker generated by the AR sticker generation unit 2200. Furthermore, the AR database 2300 may store an AR sticker template. The control unit 2400 controls an operation of each of the elements of the server.

Figure 11:
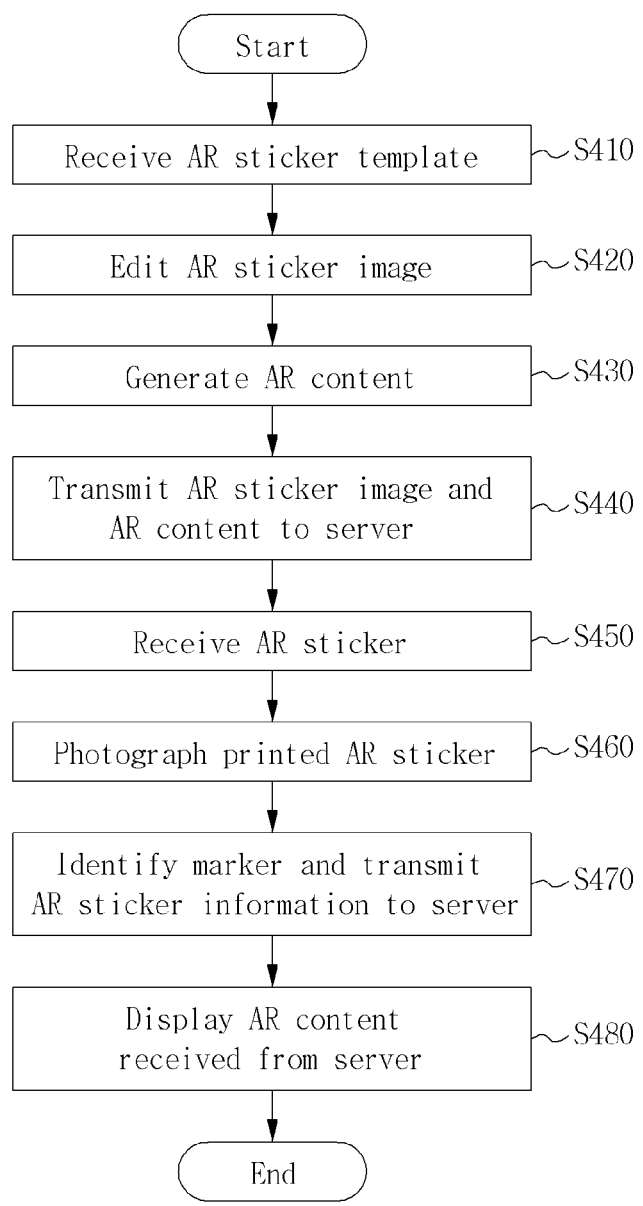
FIG. 11 is a flowchart describing a method of providing an augmented reality service by the user terminal using an AR sticker edited by a user according to another embodiment of the present invention.

FIG. 11 is a flowchart describing a method of providing an augmented reality service by the user terminal using an AR sticker edited by a user according to another embodiment of the present invention.

Referring to FIG. 11, the mobile terminal 1000 receives an AR sticker template from the server 2000 (S410), and fabricates his or her own AR sticker image by editing an image provided through the AR sticker template (S420). Thereafter, when the mobile terminal 1000 photographs an AR sticker image, the mobile terminal generates desired AR content to be displayed through an AR (S430). Thereafter, when the user transmits a directly edited AR sticker image and AR content to the server (S440), the server generates an AR sticker including the AR sticker image and AR content. The mobile terminal 1000 receives the AR sticker (S450).

After the mobile terminal 1000 requests the printing device 3000 to print the AR sticker by transmitting the AR sticker, the mobile terminal 1000 photographs the printed AR sticker (S460) and identifies a marker in the captured image. The mobile terminal 1000 transmits AR sticker information to the server (S470). Thereafter, the mobile terminal 1000 displays AR content received from the server 2000 (S480).

Figure 12:
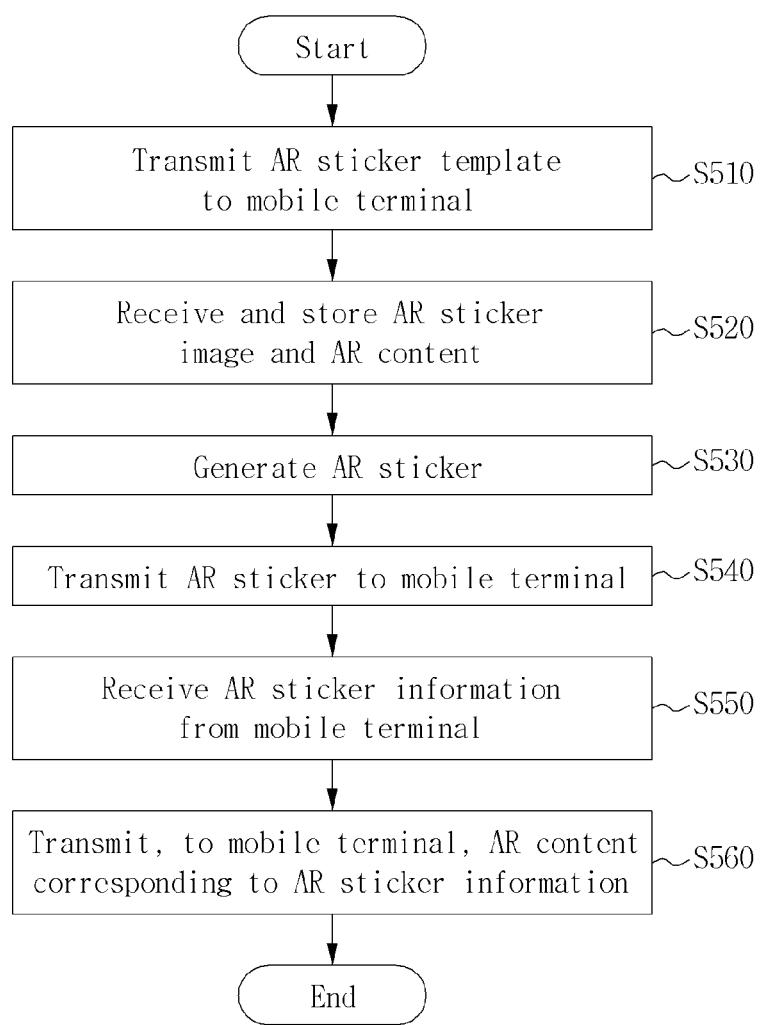
FIG. 12 is a flowchart describing a method of providing an augmented reality service by the server using an AR sticker edited by a user according to another embodiment of the present invention.

FIG. 12 is a flowchart describing a method of providing an augmented reality service by the server using an AR sticker edited by a user according to another embodiment of the present invention.

Referring to FIG. 12, the server 2000 transmits an AR sticker template to the mobile terminal 1000 (S510). Thereafter, the server receives a fabricated AR sticker image and AR content from the mobile terminal and stores the AR sticker image and AR content (S520). Thereafter, the server may generate an AR sticker by inserting a marker, corresponding to the AR content, into the AR sticker image fabricated by a user from the mobile terminal (S530). Thereafter, the server transmits the generated AR sticker to the mobile terminal (S540). When receiving AR sticker information from the mobile terminal (S550), the server transmits, to the mobile terminal 1000, AR content corresponding to the AR sticker information.

Figure 13:
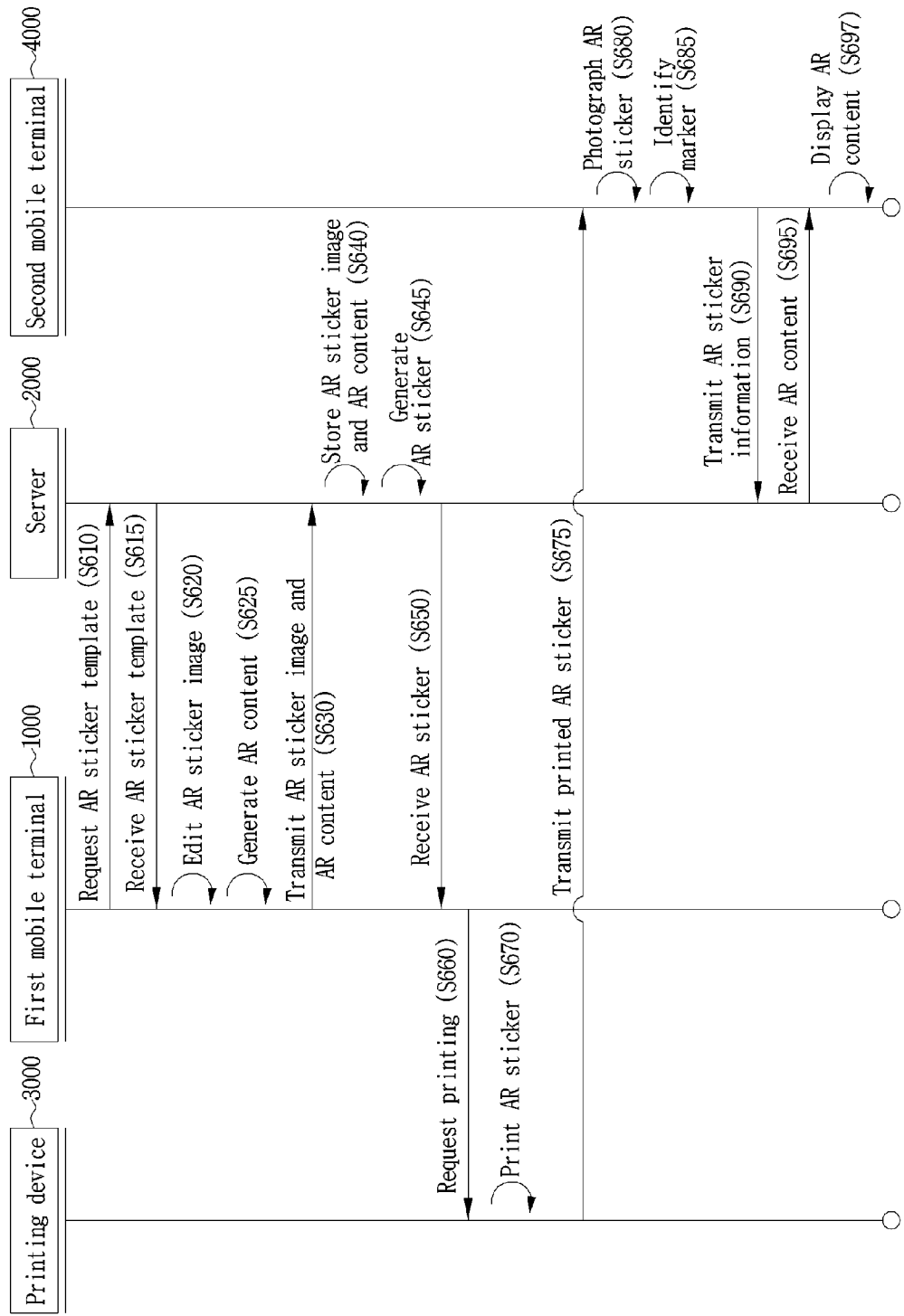
FIG. 13 is a flowchart describing a method of providing an augmented reality service using an AR sticker edited by a user according to another embodiment of the present invention.

FIG. 13 is a flowchart describing a method of providing an augmented reality service using an AR sticker edited by a user according to another embodiment of the present invention.

Referring to FIG. 13, in an operating method of a system providing an augmented reality service using an AR sticker fabricated by a user, after the first mobile terminal 1000 executes a dedicated application already downloaded from the server, the first mobile terminal 1000 requests, from the server 2000, an AR sticker template provided to be capable of being directly edited by a user (S610), and receives the AR sticker template from the server 2000 (S615). The AR sticker template provides various images and text which can be directly edited by a user. The image may be at least one of a character, an animal, a flower, a figure or a pattern. In some embodiments, the image may be a pattern used in the nail art, and may be fabricated by a user through direct drawing. The first mobile terminal 1000 directly edits an AR sticker image using the AR sticker template (S620), and generates AR content corresponding to the AR sticker image (S625). In this case, the user may generate his or her own AR content using the dedicated application of the mobile terminal 1000. That is, the AR content may include at least one of a dynamic image, a sound, text, a 2D image, a sticker, or a video. For example, a video or image may be edited through the application, or an advertising video or audio file previously stored in the mobile terminal may be selected. The first mobile terminal 1000 transmits the generated AR sticker image and AR content (S630).

Thereafter, the server 2000 receives the AR sticker image and AR content from the first mobile terminal and stores them in the AR database (S640), and generates an AR sticker including the AR sticker image and AR content (S645). In this case, a marker is inserted into the AR sticker. The marker is a key connected to the AR content, and various media may be used as the marker. For example, an AR sticker image may be used, and a separate marker may be inserted. Augmented reality (AR) content has been stored in the AR database of the server 2000 as three-dimensional stereoscopic image information.

The first mobile terminal 1000 receives the generated AR sticker from the server 2000 (S650), and requests the printing device 3000 to print the AR sticker by transmitting the AR sticker (S660).

The printing device 3000 prints the AR sticker received from the mobile terminal 1000 (S670), and transmits the printed AR sticker to the second mobile terminal (S675). In this case, the printing device 3000 may print the AR sticker on a transparent plastic member, but printing paper is not limited.

When a second mobile terminal 4000 photographs the AR sticker and identifies a marker in the obtained image (S685), the second mobile terminal transmits, to the server 2000, AR sticker information including an ID value of the corresponding marker (S690), and receives AR content corresponding to the AR sticker information (S695). In this case, the AR content may include at least one of a dynamic image, a sound, text, a 2D image, a sticker, or a video corresponding to the marker. The second mobile terminal 4000 may display the received AR content based on the AR sticker information (S697).

Figure 14:
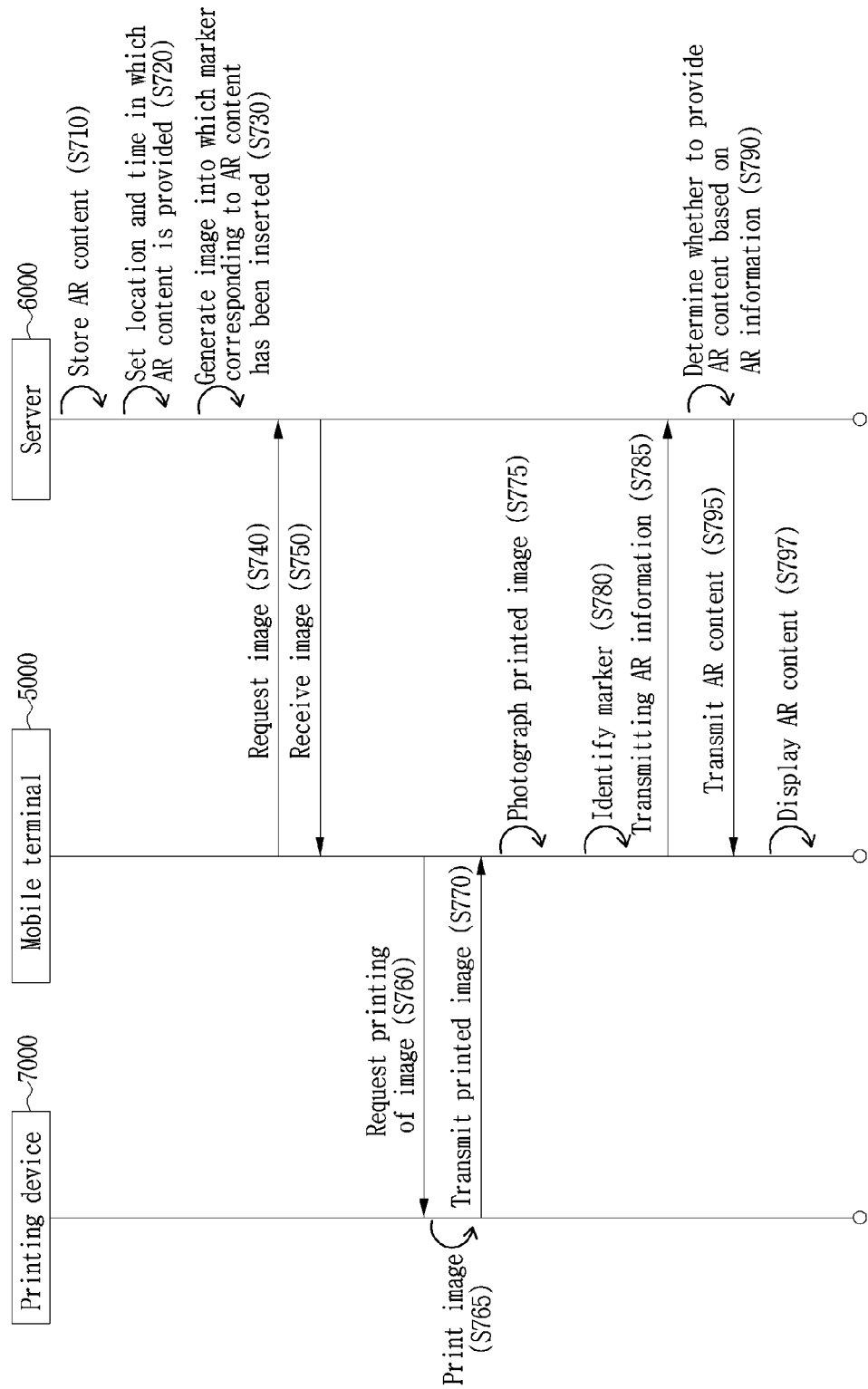
FIG. 14 is a flowchart describing a method of providing AR content based on location information and time information according to yet another embodiment of the present invention.

FIG. 14 is a flowchart describing a method of providing AR content based on location information and time information according to yet another embodiment of the present invention.

Referring to FIG. 14, in the method of providing AR content based on location information and time information, an AR server 6000 stores a plurality of pieces of AR content in a storage unit 6200 (S710). The AR content may include at least one of a dynamic image, a sound, text, a 2D image, a sticker, or a video. The AR content may be stored as three-dimensional stereoscopic image information.

The AR server 6000 sets a location range and time range in which AR content will be provided (S720). The location range and time range may be differently set for each piece of AR content. For example, regarding AR content including theater information, a location range may be set so that the AR content is displayed only at a place around the theater, and a time range may be set so that the AR content is displayed only during the time when performance is performed. That is, paid content consumption can be induced and a profits can be created by limiting the time and space and providing AR content.

The AR server 6000 generates an image into which a marker corresponding to the AR content has been inserted (S730). The marker is a key connected to the AR content, and various media may be used as the marker.

A mobile terminal 5000 executes a dedicated application already downloaded from the AR server 6000. Thereafter, when the mobile terminal 5000 requests the image into which the marker corresponding to the AR content has been inserted (S740) and receives the image (S750), the mobile terminal requests the printing of the image from a printing device 7000 (S760).

The printing device 7000 prints the received image and transmits the printed matter to the mobile terminal 5000 (S770). In this case, the output matter may be provided in various forms, and may be fabricated in various forms, such as a photo printing matter, a sticker, and an admission bracelet.

The mobile terminal 5000 photographs the printed matter (S775), and identifies the marker in the captured image (S780).

The mobile terminal 5000 requests AR content corresponding to marker information by transmitting, to the AR server 6000, AR information including at least one of the identified marker information, location information of the mobile terminal, and current time information (S785).

The AR server 6000 determines whether to provide the AR content based on the AR information (S790). In this case, the AR server extracts the AR content corresponding to the marker information by searching for the AR content, and may determine whether to provide the AR content by comparing a location range in which AR content will be provided, which is preset in the condition setting unit of the server, with the location information received from the mobile terminal. For example, if the location information is included in the preset location range, the AR server may provide the AR content.

Furthermore, the AR server extracts the AR content corresponding to the marker information, and may determine whether to provide the AR content by comparing the time information, received from the mobile terminal, with a time range in which the AR content is provided, which has been set in the condition setting unit of the AR server. For example, if the time information is included in the preset time range, the AR server may provide the AR content.

The AR server 6000 transmits the AR content to the mobile terminal 5000 (S795). The mobile terminal 5000 may display the AR content (S797).

Figure 15:
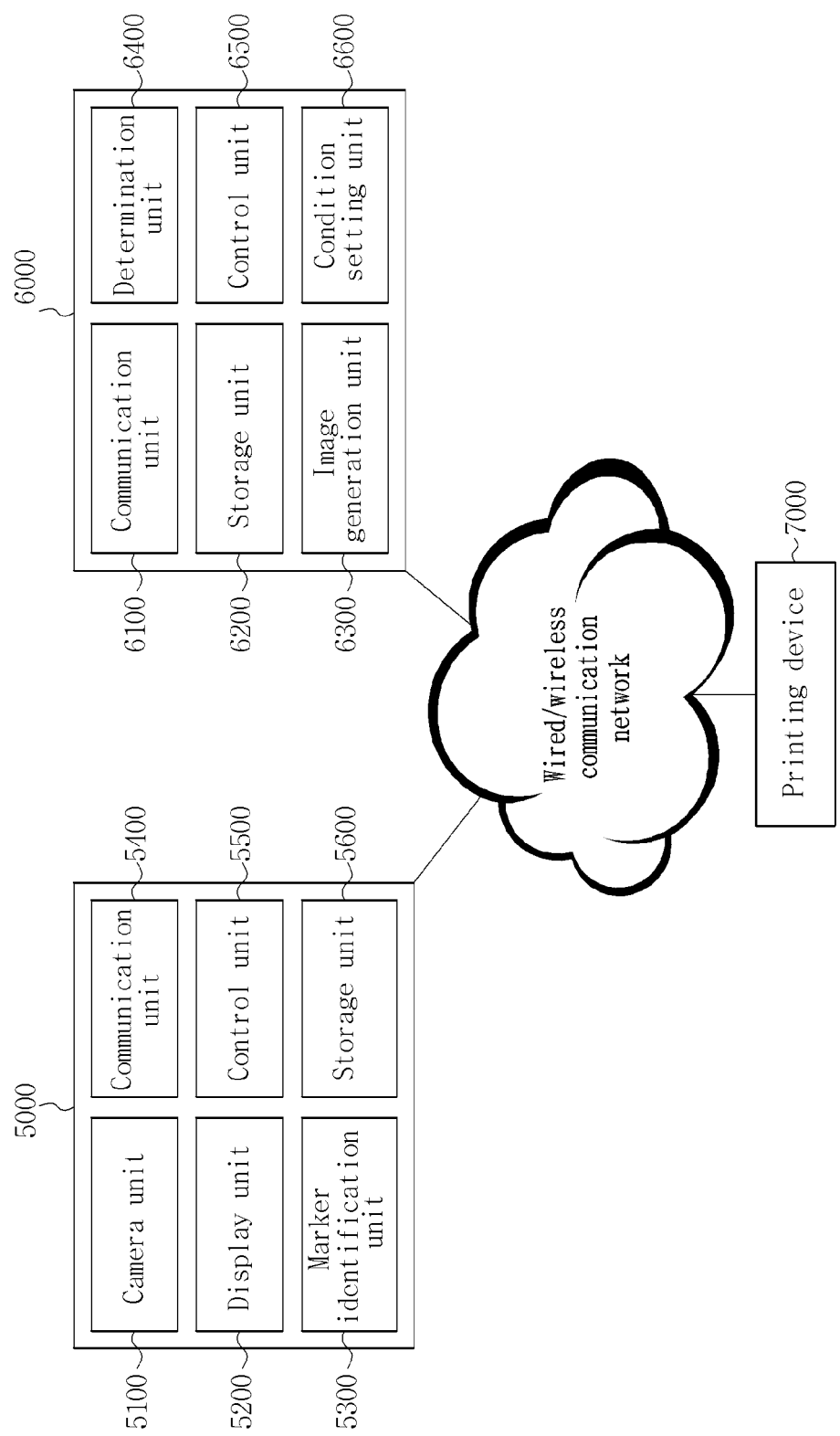
FIG. 15 is a block diagram showing the configuration of a system for providing AR content based on location information and time information according to yet another embodiment of the present invention.

FIG. 15 is a block diagram showing the configuration of a system for providing AR content based on location information and time information according to yet another embodiment of the present invention.

Referring to FIG. 15, the system for providing AR content based on location information and time information is configured with the mobile terminal 5000, the AR server 6000, and the printing device 7000.

The mobile terminal 5000 includes a camera unit 5100, a display unit 5200, a marker identification unit 5300, a communication unit 5400, a control unit 5500, and a storage unit 5600. The camera unit 5100 may capture and store an image or may obtain an image by photographing a printed matter. The display unit 5200 may display an image captured by a camera and AR content received from the server.

The marker identification unit 5300 may recognize a marker in an obtained image. The marker is a key connected to AR content, and various media may be used as the marker. When identifying the marker, the marker identification unit may extract an ID value of the corresponding marker and transmit marker information to the AR server 6000.

The communication unit 5400 may transmit, to the AR server 6000, AR information including at least one of identified marker information, location information of the mobile terminal, and current time information. The communication unit 5400 may receive, from the AR server 6000, AR content corresponding to a marker. The communication unit 5400 may transmit, to the printing device 7000, an image received from the AR server 6000, and may receive AR content from the AR server 6000.

The control unit 5500 controls the processing of a process related to the execution of application software, and controls an operation of each of the elements of the mobile terminal 5000. The control unit 5500 may control the processing of a process related to execution using a web browser through the World Wide Web in addition to application software.

An input unit (not shown) receives an input event executed by input means. The input unit may be a touch screen, and transmits a touch event to the control unit 5500. If the mobile terminal 5000 is a desktop PC or a laptop PC, the input unit may receive an input event through a mouse.

In the specification of the present invention, the mobile terminal 5000 is a computing device, and is a mobile computing device which can drive a predetermined processor according to operating system software and various types of application software and which can be easily carried and used while moving like a smartphone or a tablet PC, but the present disclosure is not limited thereto. A desktop PC or a laptop PC may also be applied the mobile terminal.

The AR server 6000 is configured with a communication unit 6100, a storage unit 6200, an image generation unit 6300, a determination unit 6400, a control unit 6500, and a condition setting unit 6600.

When receiving a request for an image from the mobile terminal 5000, the communication unit 6100 may transmit an image generated by the image generation unit. Furthermore, when receiving AR information from the mobile terminal 5000, the communication unit 6100 may search for AR content corresponding to the AR information, and may provide the retrieved AR content.

Augmented reality (AR) content has been stored in the storage unit 6200 as three-dimensional stereoscopic image information. The AR content may include at least one of a dynamic image, a sound, text, a 2D image, a sticker, or a video. The storage unit 6200 may store a location range and time range set in each of pieces of AR content.

The image generation unit 6300 may generate an image into which a marker corresponding to AR content has been inserted. The marker is a key connected to the AR content, and various media may be used as the marker. The image may be transmitted to the printing device and printed.

When receiving AR information, including marker information, location information, or time information, from the mobile terminal 5000, the determination unit 6400 extracts, from the storage unit, AR content corresponding to the marker information, and extracts a location range and time range already set in the AR content.

The determination unit 6400 may determine whether to provide the AR content by comparing the location information, received from the mobile terminal, with a location range in which the AR content will be provided, which has been set in the condition setting unit of the AR server. For example, if the location information is included in the preset location range, the determination unit may provide the AR content.

The determination unit 6400 extracts AR content corresponding to the marker information, and may determine whether to provide the AR content by comparing the time information, received from the mobile terminal, with a time range in which the AR content is provided, which has been set in the condition setting unit of the AR server. For example, if the time information is included in the preset time range, the determination unit may provide the AR content.

When the received location information and time information are within the corresponding time and location ranges of the AR content, the determination unit 6400 may determine to provide the AR content.

When the location information and time information do not satisfy the time and location ranges of the AR content, the determination unit 6400 may induce a purchase without providing the AR content.

The control unit 6500 controls the processing of a process related to the execution of software operating in the AR server 6000, and controls an operation of each of the elements of the AR server 6000.

The condition setting unit 6600 may set the location range and time range in which the AR content will be provided. The location range and time range may be differently set for each piece of AR content.

The printing device 7000 is a portable printing device equipped with short-distance radio communication means, and may output a printed matter by printing an image received from the mobile terminal 5000 through the short-distance radio communication means. In this case, the printing device 7000 may output the image on photo-dedicated paper, paper or a plastic member, but a printing member is not limited. The short-distance radio communication means may be any one of short-distance radio communication protocols, such as Bluetooth, a radio frequency identification (RFID), infrared data association (IrDA), a ultra wideband (UWB), Zigbee (IEEE 802.15.4), and Wi-Fi, but the present disclosure is not limited thereto. The printing device may be configured to receive an image through wired communication.

Figure 16:
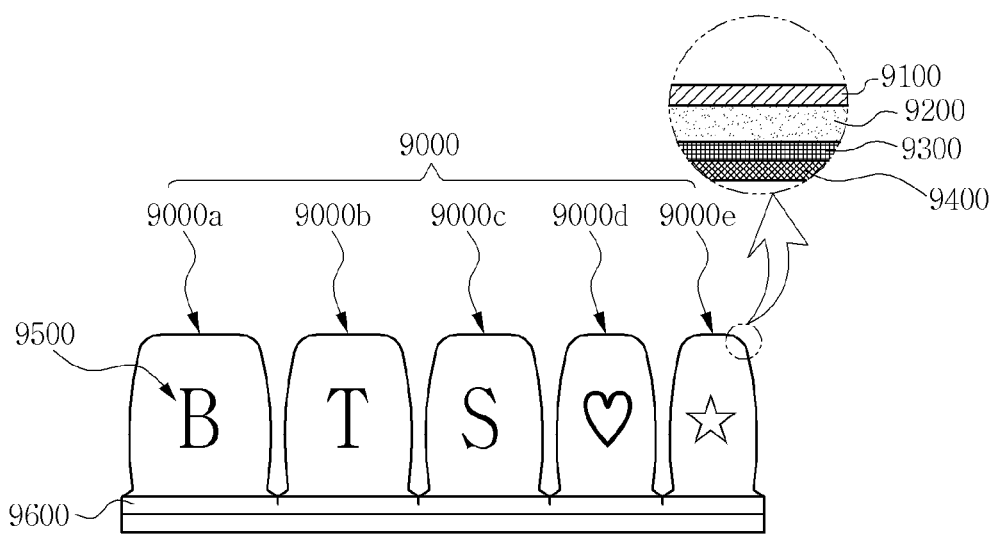
FIGS. 16 to 18 are use state diagrams of a method of providing AR content based on location information and time information according to yet another embodiment of the present invention.
Figure 17:
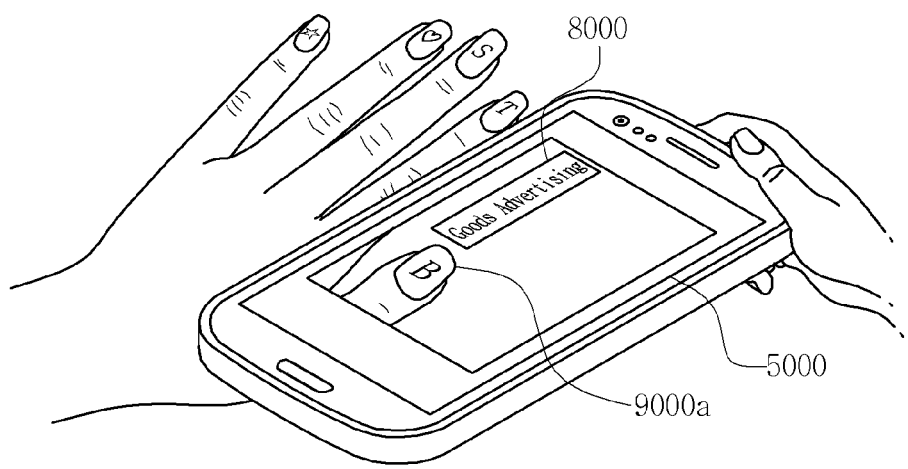
Figure 18:
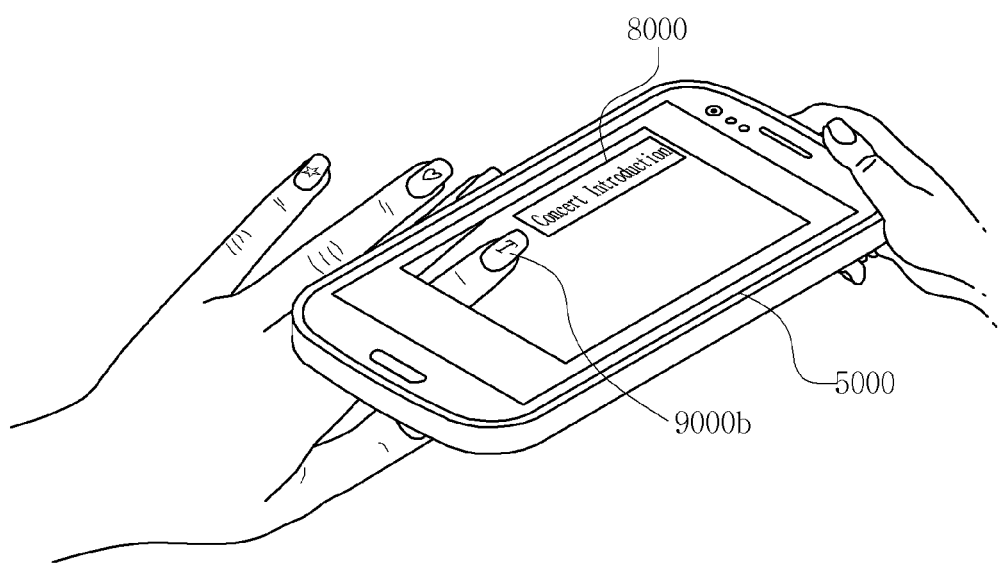

FIGS. 16 to 18 are use state diagrams of a method of providing AR content based on location information and time information according to yet another embodiment of the present invention.

Referring to FIGS. 16 to 18, an adhesion type nail sticker 9000 may include a set of multiple adhesion type nail stickers 9000a, 9000b, 9000c, 9000d, and 9000e each corresponding a nail shape, which has a structure in which the multiple adhesion type nail stickers have been arranged in parallel, by stamping the adhesion type nail sticker 9000 using a stamping cutter. The adhesion type nail sticker 9000 is configured with a nail sticker for thumb 9000a, a nail sticker for index finger 9000b, a nail sticker for middle finger 9000c, a nail sticker for ring finger 9000d, and a nail sticker for little finger 9000e, which may be formed to have different areas and shapes depending on their nail sizes. In the present invention, the set of five adhesion type nail stickers 9000 arranged in parallel has been illustrated as an example, but the present invention is not limited thereto. That is, each of the nail stickers 9000a to 9000e can be cut along cutting lines 9600 because the cutting lines 9600 are arranged in the adhesion type nail sticker 9000 in parallel.

The adhesion type nail sticker 9000 may be configured with a design layer 9100, a release layer 9200, a base layer 9300, and an adhesion layer 9400 having a stack structure. An image into which a marker corresponding to AR content has been inserted may be received, and may be printed on the design layer 9100 by a printing device.

The release layer 9200 may be formed using a silicon resin, a fluorine resin, PE or a polymerized release agent of an alkyl-containing vinyl monomer or may be formed using paper, PET, or PP release-processed using a release agent material.

The base layer 9300 may be one of a polystyrene (PS) resin, an ABS resin (acrylonitrile butadiene styrene copolymer), a styrene-butadiene-styrene (SBS) block copolymer, an EVA resin (ethylene vinyl acetate copolymer), PE, PP, PVC, TPU, polyamide, polyester, EVA, acryl-series polymer and acryl-series polymer or may be formed using a mixture of at least two types of them.

The adhesion layer 9400 may be any one of pressure sensitive adhesive (PSA), acryl-series adhesives, vinyl monomer-series polymerized adhesives, rubber-series adhesives and polyurethane-series lyotropic adhesives or a mixture of them.

Figure 19:
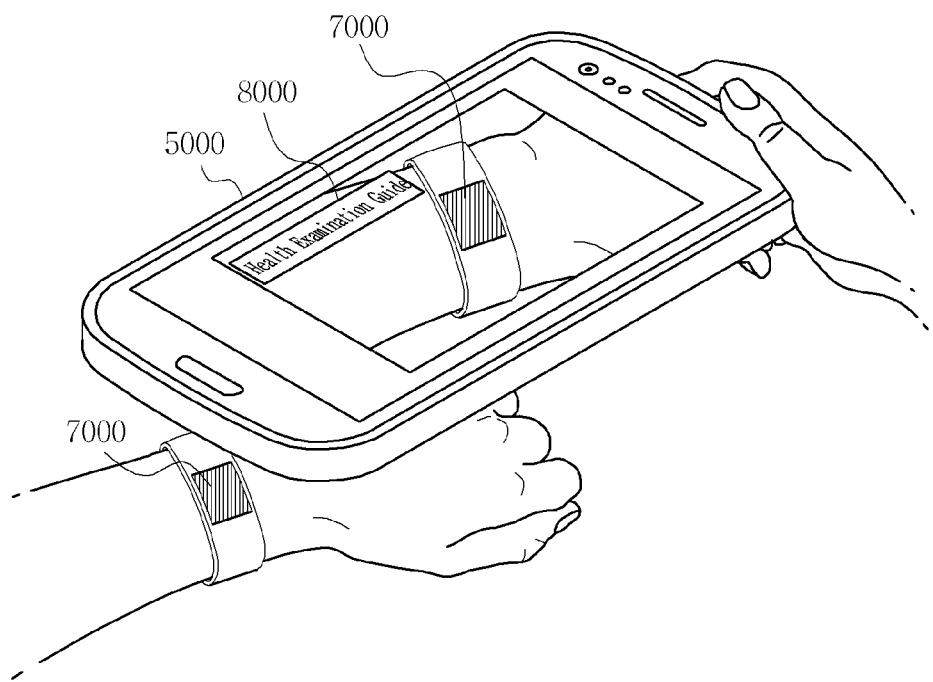
FIG. 19 is a use state diagram of a method of providing AR content based on location information and time information according to yet another embodiment of the present invention.

That is, the present invention may provide various types of AR content by outputting images into which different markers have been inserted for each nail sticker. For example, referring to FIG. 18, when an image into which a marker printed on the nail sticker for thumb 9000a has been inserted is photographed, "Entertainer Goods Advertising", that is, AR content 8000 corresponding to the corresponding marker, may be provided. Referring to FIG. 19, when an image into which a marker printed on the nail sticker for index finger 9000b has been inserted is photographed, "Concert Introduction", that is, AR content 8000 corresponding to the corresponding marker, may be provided. That is, various types of AR content corresponding to respective nail stickers may be provided based on location information and time information.

Furthermore, the present invention may be implemented in a member which can be transcribed into skin in addition to a nail sticker. An image into which a marker has been inserted may be printed on a flexible material and attached to a body portion of a person.

FIG. 19 is a use state diagram of a method of providing AR content based on location information and time information according to yet another embodiment of the present invention.

Referring to FIG. 19, the mobile terminal 1000 photographs a printed matter 5000 output by a printing device. The marker identification unit of the mobile terminal 1000 identifies a marker included in a printed matter 7000, and displays AR content 8000 received from the AR server 6000. The AR content 8000 may include at least one of a dynamic image, a sound, text, a 2D image, a sticker or a video corresponding to the marker. The AR information may include the marker of an AR object, location information of the mobile terminal, and time information.

In some embodiments, the present invention may be applied in association with a medical service within a hospital. Pieces of AR content for drug administrated, examination, a disease item guidance and notice for each patient may be produced and stored in the server. When an image is generated and output based on AR content and provided to a patient, the patient may be provided with the AR content in a medical waiting time by photographing the output matter, and may receive item guidance and notice. In this case, the AR content may be provided only within a hospital, that is, a space limited based on an already set location range.

Furthermore, the present invention may be applied an entertainer goods sales service. Start AR content related to an event may be produced and stored in the server. When a sticker image is generated and output based on AR content and provided to fans, the fans may be provided with the AR content in a concert waiting time by photographing the output matter. In this case, the AR content may be provided only within a limited time based on an already set time range.

Although the embodiments of the present invention have been described with reference to the accompanying drawings, they are only illustrative. A person having ordinary skill in the art will understand that various modifications and other equivalent embodiments are possible from the present invention. Accordingly, the true technical range of protection of the present invention should be determined by the following claims.

The invention claimed is:

1. A method of providing an augmented reality service based on location information and time information and using an AR sticker fabricated by a user, the method comprising steps of:
    (a) requesting, by a mobile terminal, a server to send an AR sticker template, and transmitting, by the server, the AR sticker template, wherein the server sets a location range and a time range in which the AR sticker template is to be provided, and the AR sticker is capable of being directly edited by a user of the mobile terminal;
    (b) directly editing, by the mobile terminal, an AR sticker image using the AR sticker template and generating an AR content corresponding to the AR sticker image;
    (c) receiving, by the server, the AR sticker image and the AR content from the mobile terminal, storing the received AR sticker image and the received AR content in an AR database, and generating an AR sticker comprising the received AR sticker image and the received AR content;
    (d) receiving, by the mobile terminal, the AR sticker generated by the server and requesting a printing device to print the AR sticker by transmitting the AR sticker; and
    (e) printing, by the printing device, the transmitted AR sticker on a transparent plastic member and transmitting the printed AR sticker.

2. The method of claim 1, further comprising steps of:
    (f) photographing, by the mobile terminal, the AR sticker, transmitting an AR sticker information to the server when a marker is identified in an obtained image, and receiving an AR content corresponding to the AR sticker information; and
    (g) displaying, by the mobile terminal, the received AR content based on the AR sticker information.

3. The method of claim 1, wherein the AR content comprises at least any one of a dynamic image, a sound, text, a 2D image, a sticker, and a video corresponding to the marker.

4. A system providing an augmented reality service based on location information and time information and using an AR sticker fabricated by a user, the system comprising:
    a mobile terminal receiving, from a server, an AR sticker template being capable of being directly edited by a user, editing an AR sticker image, generating a corresponding AR content, and transmitting the edited AR sticker image and the generated AR content to the server;
    the server receiving the edited AR sticker image and the generated AR content from the mobile terminal, setting a location range and a time range in which the generated AR content is to be provided, storing the edited AR sticker image and the received AR content in an AR database, and generating an AR sticker by inserting a marker based on the received AR content into the edited AR sticker image; and
    a printing device printing the AR sticker received from the mobile terminal and transmitting the printed AR sticker.

5. The system of claim 4, wherein:
    the mobile terminal comprises an AR content generation unit generating the AR content overlapped and displayed on the AR sticker image in response to a user input, and
    the AR content is at least one of a dynamic image, a sound, text, a 2D image, a sticker, and a video.

6. The system of claim 4, wherein the server comprises an AR sticker generation unit generating the AR sticker by inserting the marker corresponding to the AR content into the AR sticker image.

7. The system of claim 4, wherein:
    the AR sticker template comprises various images and text capable of being directly edited by the user, and
    the image is at least one of a character, an animal, a flower, a figure, and a pattern.

8. A method of providing AR content based on location information and time information, the method comprising steps of:
    (a) storing, by an AR server, a plurality of pieces of AR content and setting a location range and time range in which the AR content is to be provided;
    (b) generating, by the AR server, an image into which a marker corresponding to the AR content has been inserted;
    (c) receiving, by a mobile terminal, the generated image from the AR server by requesting the image from the AR server;
    (d) requesting, by the mobile terminal, a printing device to print the received image by transmitting the received image, identifying the marker by photographing a printout printed by the printing device, and transmitting AR information to the AR server;
    (e) determining, by the AR server, whether to provide the AR content based on the received AR information.

9. The method of claim 8, wherein the AR information comprises at least one of marker information, location information of the mobile terminal or time information.

10. The method of claim 8, wherein the step (e) comprises:
    extracting AR content corresponding to the marker information, and determining whether to provide the AR content by comparing location information, received from the mobile terminal, with a location range in which the AR content is to be provided, which is preset in a condition setting unit of the server.

11. The method of claim 8, wherein the step (e) comprises:

extracting AR content corresponding to the marker information, and determining whether to provide the AR content by comparing time information, received from the mobile terminal, with a time range in which the AR content is provided, which is set in a condition setting unit of the AR server.

12. The method of claim 8, wherein:

the printout printed by the printing device is an adhesion type nail sticker, the adhesion type nail sticker has a stack structure of an adhesion layer, a base layer, a design layer, and a release layer, and an image into which the marker corresponding to the AR content has been inserted is printed on the design layer.

13. A system for providing AR content based on location information and time information, the system comprising:

a mobile terminal identifying a marker by photographing a printout and transmitting, to an AR server, AR information comprising at least one of the marker, location information or time information;

the AR server setting a location range and time range in which AR content is to be provided, generating an image into which a marker corresponding to the AR content has been inserted, providing the image to the mobile terminal, and determining whether to provide the AR content based on the AR information received from the mobile terminal; and a printing device printing an image received from the mobile terminal and transmitting a printout.

* * * * *